Oct. 8, 1946.                 W. M. GOODALL                 2,408,773
                         POSITION DETERMINING SYSTEM
                            Filed March 31, 1942
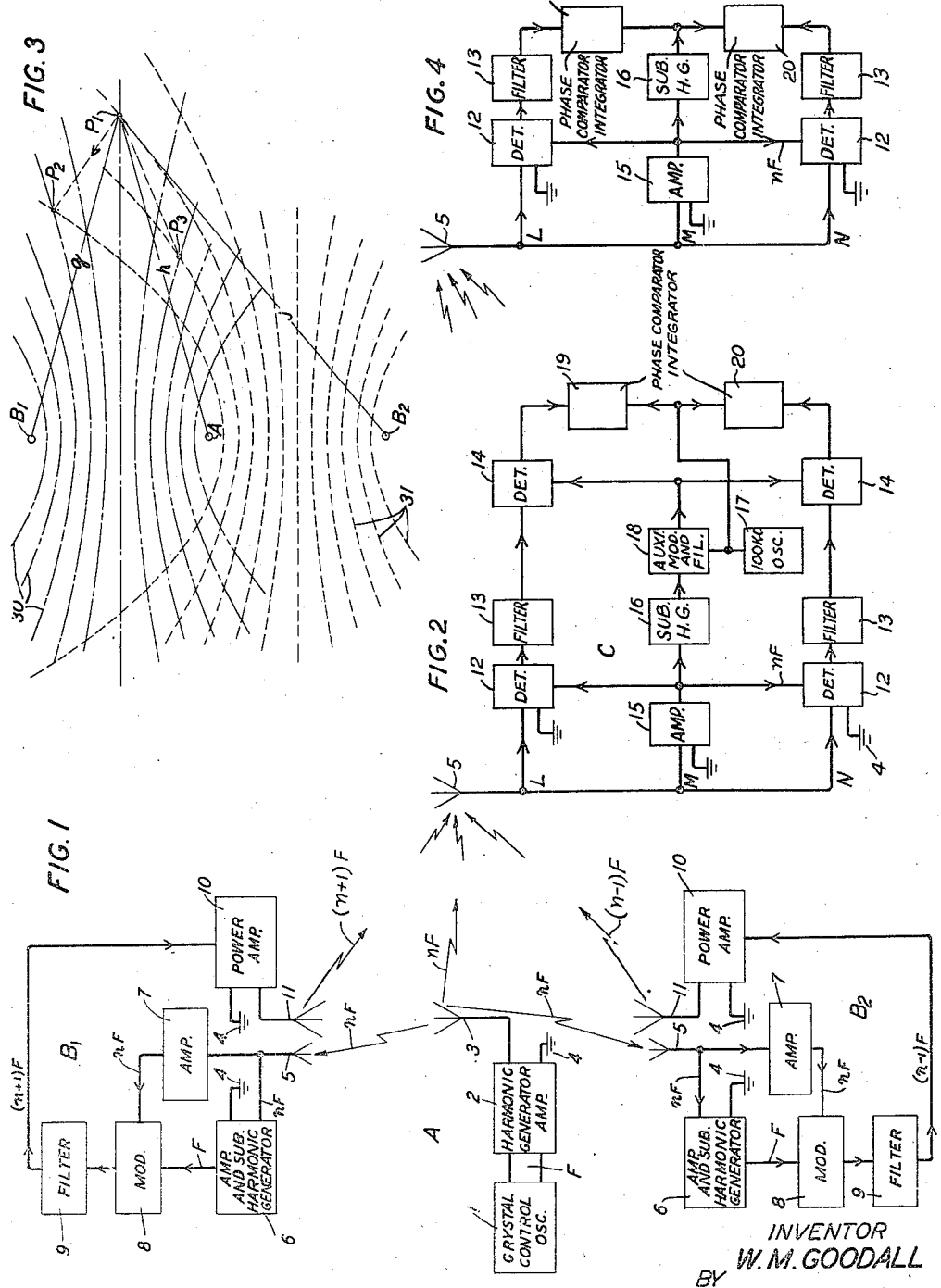
INVENTOR
W. M. GOODALL
BY
A. J. Zerbarini
ATTORNEY Patented Oct. 8, 1946

2,408,773

UNITED STATES PATENT OFFICE 2,408,773

POSITION DETERMINING SYSTEM

William M. Goodall, Oakhurst, N. J., assignor to Bell Telephone Laboratories, Incorporated, New York, N. Y., a corporation of New York Application March 31, 1942, Serial No. 436,995

10 Claims. (Cl. 250—11)

This invention relates to radio position-determining methods and systems and particularly to methods and means for ascertaining the position of a mobile body relative to one or more ground stations.

As disclosed in German Patent 546,000, M. Harms, March 8, 1932; United States Patents 2,148,267, E. A. H. Honore, February 21, 1939, 1,995,285, W. Albersheim et al., March 26, 1935, and 2,198,113, P. J. Holmes, April 23 1940, the change in location of a mobile body such as an airplane relative to a pair of spaced ground stations may be determined at the mobile body by integrating, during the entire travel or movement of said body, the changes in phase angle of a detected low frequency "signal" current having a non-uniformly changing phase angle representing at each instant the position of said body with respect to said stations. In at least one of the above-mentioned systems, the integration is effected by continuously comparing the signal current phase angle with that of a "reference" current having the same low frequency and a uniformly changing phase angle which is independent, or substantially independent, of the position of the body. The signal current is derived from two waves having different frequencies and received from different ground stations, one of which may be a relay station; and the reference current is obtained from a local low frequency reference oscillator on the mobile body or from one of said incoming waves and a third wave of still another frequency emitted by one of the ground stations or by an auxiliary ground station. For the purpose of securing a geographical position determination, a second relay station may be utilized.

As is apparent, for successful operation of the system using the local low frequency reference oscillator, the frequency of the reference current must be maintained in exact synchronism with that of the received signal current and, in the other arrangements, the proper frequency relations and the absolute phase relations of the several emitted beacon waves must be preserved. Heretofore, completely satisfactory results have not been attained in practice in using the above systems primarily because of the difficulty of securing a local reference low frequency oscillator which is highly stable as to frequency and also in view of the difficulty of synchronizing or exactly relating the frequencies of the various transmitted waves.

It is one object of this invention to determine accurately the position of a mobile body.

It is another object of this invention to eliminate in a system utilizing a relay or repeater transmitter, interaction between the incoming and outgoing energies.

It is still another object of this invention to secure and maintain, in a phase-integration position-determining method and system, the proper frequency relations and the proper initial or absolute phase angle relations among the radio frequency waves transmitted from the ground stations.

In accordance with the preferred embodiment of the invention, the various radio frequencies emitted from the three ground stations in a position-determining phase-integration system are all derived only from a single source of energy; and, in accordance with a modification, the above-mentioned radio frequency and also the intermediate or low frequencies supplied to the phase integrators are all derived only from a single oscillator having a high frequency stability and located at one of the ground stations. More particularly, the primary ground station A comprises a crystal-controlled oscillator generating a frequency $F$ equal, for example, of three megacycles, and this station emits a wave $nF$, where $n$ equals any integer but preferably a large integer such as 8. At each of the relay ground stations $B_1$ and $B_2$, the wave $nF$ is received, and waves are obtained therefrom having frequencies $(n+1)F$ and $(n-1)F$ which are emitted, respectively, by these secondary stations. The receiver C at the aircraft includes separate detecting channels for obtaining from waves $nF$ and $(n+1)F$ a first high frequency signal current, from waves $nF$ and $(n-1)F$ a second high frequency signal current and from wave $nF$ a reference high frequency current. The phase angle of the first signal current contains a component or factor representing the difference in distances between the aircraft and stations A and $B_1$ and another component representing the distance between the aircraft and station A. Similarly, the phase angle of the second signal current contains two components, one representative of the difference in the distances of the mobile receiver from stations A and $B_2$ and the other representative of only the distance between the receiver and station A. The phase angle of the reference current includes a component which represents the distance between the aircraft and station A. At the mobile receiver, a 100-kilocycle wave is obtained from a local beat oscillator and combined with the aforementioned reference current to produce a resultant current, which is separately combined or modulated with each high frequency signal current for the purpose of obtaining a first detected signal current and a second detected signal current corresponding, respectively, to the first and second high frequency signal currents. The phase angle of each detected signal current includes the component representing the difference in distances of the aircraft from the associated stations A and $B_1$ or $B_2$, but does not include the component representing the distance between the receiver C and station A, since the components representative of this variable distance mutually cancel in the modulation process. Each of the detected signals is supplied, together with an unmodulated 100-kilocycle reference wave from the beat oscillator, to a different combined phase comparator-integrator. Each comparator-integrator functions to determine during movement of the plane the total phase angle change in the signal current supplied thereto, the total change being a measure of the change of position, both as regards sense and amount, of the aircraft relative to the two associated stations. The 100-kilocycle oscillator is not necessarily of a high frequency stability type.

If desired, for economical or other reasons, the above-described system may be modified to omit the 100-kilocycle oscillator and associated apparatus. In the modified arrangement the first high frequency signal current and a portion of the high frequency reference current are supplied to one combined phase comparator-integrator and the second high frequency signal current and another portion of the reference high frequency are supplied to the other comparator-integrator. In the case of each comparator-integrator the phase angle components of the wave supplied thereto and representing the distance of the aircraft from station A cancel each other so that the integrated phase angle indication represents the net change in the difference of the distances separating the aircraft from the associated stations A and $B_1$ or $B_2$. The arrangement comprising the 100-kilocycle oscillator is more accurate than the modified embodiment since the integrated phase angle change in each signal current is transferred or impressed upon a lower frequency.

The invention will be more fully understood from a perusal of the following specification taken in conjunction with the drawing on which like reference characters denote elements of a similar function, and on which:

Fig. 1 illustrates the transmitting apparatus used at the primary and relay ground stations;

Fig. 2 illustrates the preferred receiving equipment used at the mobile station;

Fig. 3 illustrates the space patterns established by the transmitting stations; and Fig. 4 illustrates a modified receiver which may be used in place of the apparatus of Fig. 2.

Referring to Fig. 1, reference character A denotes a main or primary ground transmitting station and reference characters $B_1$ and $B_2$ designate relay or repeater ground stations each spaced ordinarily a distance of 25-50, or even 100-500 miles, from station A. The primary station A includes a frequency stabilized crystal-controlled oscillator 1 which is connected through a combined harmonic generator-amplifier 2 to a non-directional antenna system comprising the aerial 3 and the ground 4. Each of relay stations $B_1$ and $B_2$ includes a receiving aerial 5, a combined amplifier-subharmonic generator 6, amplifier 7, modulator 8, filter 9, power amplifier 10 and non-directional transmitting aerial 11.

Referring to Fig. 2, the receiving apparatus at the mobile station C comprises a non-directional receiving antenna 5, common to the three receiving branches or channels L, M, and N. Channels L and N each comprise a first detector 12, a filter 13, a second detector 14. Channel M includes a radio frequency amplifier 15, the output of which is connected to the input of the first detectors 12 in channels L and N, a subharmonic generator 16, an intermediate frequency local beat oscillator 17, an auxiliary modulator-filter 18 having its input terminals connected to the subharmonic generator 16 and to the local oscillator 17 and its output connected to the input of the second detectors 14 in channels L and N. Reference numeral 19 denotes a phase comparator-integrator including a cycle counter, the integrator being connected between the output terminals of the intermediate frequency oscillator 17 and the second detector 14 in channel L; and numeral 20 designates a similar comparator-integrator connected between the output terminals of oscillator 17 and detector 14 in channel N. The comparator-integrators each comprise a phase angle meter equipped with a counter and may be of the electrical type illustrated by Patent 1,934,400, J. H. Bollman, November 7, 1933, the gearbox 36 in the Bollman system being replaced by a counter for counting the number of cycles of phase angle change. Alternatively, the integrator may be of a mechanical type comprising a differential gear assembly, such as illustrated by Patent 1,907,132, G. M. Thurston, May 2, 1933, a counter being attached to the crown gear 41 of the Thurston system.

In operation, the crystal-controlled oscillator 1 at primary station A generates and supplies a wave having a constant frequency F equal, for example, to three megacycles to the harmonic generator-amplifier 2, which functions to produce a wave having a large intensity and a frequency $nF$ where $n$ is any integer but preferably is a large integer such as 8. The wave $nF$ is radiated by aerial 3 and intercepted by receiving antennas 5 at stations $B_1$ and $B_2$. At each of relay stations $B_1$ and $B_2$ the received wave $nF$ is supplied over different paths to the input of the subharmonic generator-amplifier 6 and the amplifier 7. The subharmonic generator 6 functions to derive from the wave $nF$ a wave of frequency F which is combined in the modulator 8 with the wave $nF$ from amplifier 7 for the purpose of producing among other components the side-band frequencies $nF+F$ and $nF-F$. The filter 9 connected to the output of the modulator 8 at station $B_1$ passes only the upper side-band frequency $(n+1)F$, whereas the corresponding filter at station $B_2$ passes only the lower side-band frequency $(n+1)F$. At each relay station the selected side-band is amplified by amplifier 10 and radiated non-directionally by antenna 11. As radiated, the phase angle of the waves emitted by antenna 3 and the two relay antennas 11 may be represented as follows:

From antenna 3, station A $$\cos 2\pi(nF)(t+\alpha_1) \quad (1)$$

from antenna 11, station $B_1$ $$\cos 2\pi(n+1)F(t+\alpha_2) \quad (2)$$

from antenna 11, station $B_2$ $$\cos 2\pi(n-1)F(t+\alpha_3) \quad (3)$$

where $t$ denotes time in seconds, and $\alpha_1$, $\alpha_2$ and $\alpha_3$ are time factors which differ from each other. The differences among $\alpha_1$, $\alpha_2$ and $\alpha_3$ and the phase variations introduced in the equipment at relay stations $B_1$ and $B_2$, may be compensated if desired in accordance with the teaching of Patent 1,926,169, H. Nyquist, September 11, 1933.

At the mobile station C the waves $nF$, $(n+1)F$ and $(n-1)F$ from stations A, $B_1$ and $B_2$, respectively, are intercepted by antenna 5. Assuming $\alpha_1$, $\alpha_2$ and $\alpha_3$ have been compensated and, in effect, eliminated by proper adjustments at stations $B_1$ and $B_2$, the phase angle of the waves, as received, may be represented as follows:

From antenna 3, station A $$\cos 2\pi nF\left(t-\frac{h}{c}\right) \quad (4)$$

from antenna 11, station $B_1$ $$\cos 2\pi (n+1)F\left(t-\frac{g}{c}\right) \quad (5)$$

from antenna 11, station $B_2$ $$\cos 2\pi (n-1)F\left(t-\frac{j}{c}\right) \quad (6)$$

where $c$ is the velocity of propagation in space of the wave and, as shown in Fig. 3, $h$, $g$, and $j$ are distances, respectively, at any given instant separating the mobile station C from the ground stations A, $B_1$ and $B_2$. The factor "$\cos 2\pi$" in the phase angle expressions given above is a constant and hereafter will be omitted for the sake of clarity.

The received waves are supplied directly to the detectors 12 in channels L and N and are also supplied to these detectors through the amplifier 15 in channel M. Of the various modulation products present in the output of each of the detectors 12 only one of the side-band currents obtained by combining the waves received from station A, Equation 4, and from station $B_1$, Equation 5, and represented by Equation 15, given below is passed through the filter 13 in channel L. The sum and difference currents obtained by combining Equations 4 and 5 may be represented:

$$\left[nFt-nF\frac{h}{c}\right]\pm\left[(n+1)(F)\left(t-\frac{g}{c}\right)\right] \quad (7)$$

the lower side-band or difference frequency being:

$$\left[nFt-nF\frac{h}{c}\right]-\left[(n+1)(F)\left(t-\frac{g}{c}\right)\right] \quad (8)$$

Substituting for $$-nF\frac{h}{c} \quad (9)$$

the equality $$+\frac{Fh}{c}-(n+1)F\frac{h}{c} \quad (10)$$

we have $$nFt+\frac{Fh}{c}-(n+1)F\left(\frac{h}{c}\right)-(n+1)Ft+(n+1)F\frac{g}{c}= \quad (11)$$

$$nFt-nFt-Ft+F\frac{h}{c}-(n+1)F\frac{h}{c}+(n+1)F\frac{g}{c}= \quad (12)$$

$$-Ft+F\frac{h}{c}-(n+1)F\frac{h}{c}+(n+1)F\frac{g}{c}= \quad (13)$$

$$-F\left(t-\frac{h}{c}\right)-(n+1)(F)\left(\frac{h-g}{c}\right) \quad (14)$$

so that the phase angle of the current in the output of the filter 13 in channel L is $$+\cos 2\pi\left[+F\left(t-\frac{h}{c}\right)+(n+1)F\frac{h-g}{c}\right] \quad (15)$$

From Equation 15 it is apparent that the phase angle variation is dependent on two factors, namely, the distance $h$ of station C from station A and the difference $h-g$ between the distances of station C from stations A and $B_1$.

Similarly, in channel N, the filter 13 passes only the lower side-band current obtained by subtracting Equation 6 from Equation 4 and represented by the following equation:

$$+\cos 2\pi\left[+F\left(t-\frac{h}{c}\right)+(n-1)F\left(\frac{j-h}{c}\right)\right] \quad (16)$$

Considering channel M, the subharmonic generator 16 connected to the output or amplifier 15 functions to derive from the incoming wave, $$nF\left(t-\frac{h}{c}\right) \quad (17)$$

a wave $$F\left(t-\frac{h}{c}\right) \quad (18)$$

and this wave is combined in the auxiliary modulator filter 18 with a beat wave $$\cos 2\pi ft \quad (19)$$

from the 100-kilocycle oscillator to produce the side-band $$\cos 2\pi\left[F\left(t-\frac{h}{c}\right)+ft\right] \quad (20)$$

The wave represented by Equation 20 is combined in detectors 14 in channels L and N with the side-band currents represented, respectively, by Equations 15 and 16 to produce in the output of the detector 14, channel L, the signal current, $$\cos 2\pi\left[ft+(n+1)F\left(\frac{h-g}{c}\right)\right] \quad (21)$$

and in the output of detector 14, channel N, the signal current $$\cos 2\pi\left[ft+(n-1)F\left(\frac{j-h}{c}\right)\right] \quad (22)$$

The signal current from channel L and a portion of the reference current from oscillator 17 are supplied to the comparator-integrator 19, and the signal current from channel N and another portion of the reference current from oscillator 17 are supplied to the comparator-integrator 20.

It is apparent that Equation 21 represents a family or set of hyperbolic isophase curves for each of which the factor $$\frac{h-g}{c}$$

is a constant and that Equation 22 represents another set of hyperbolic curves for each of which the factor $$\frac{j-h}{c}$$

is constant. Referring to Fig. 3, the curves 30 represent several of the hyperbolic courses corresponding to Equation 21 and the curves 31 illustrate several of the hyperbolic lines corresponding to Equation 22, the foci of curves 30 being at stations A and $B_1$ and the foci of curves 31 being at stations A and $B_2$. Considering two adjacent hyperbolic curves 30 (or 31) the difference between the values of the factor $$\frac{h-g}{c}\left(\text{or }\frac{j-h}{c}\right)$$

for the two curves may for convenience be taken as one wave-length.

The phase angle given by Equation 21 and integrated during the movement of the mobile body or airplane does not change when the airplane moves along a path coinciding with one of the curves 30, but does change when the movement is not along one of these paths. Similarly, the phase angle given by Equation 22 changes only when the airplane moves in a direction making an angle with the curves 31. Considering the hyperbolic system established by stations A and $B_1$ and assuming the airplane is at a location such as $P_1$, Fig. 3, on the particular curve 30 representing the condition $h-g=0$, the rotation or angular speed of the vector of the detected signal current supplied to the integrator 19, which vector rotates in a counter-clockwise direction, is constant. As the plane moves toward the position $P_2$ located farther away from station A and nearer to station $B_1$, the factor $$\frac{h-g}{c}$$

assumes a positive value and it increases as the plane moves toward position $P_2$. Hence, the phase angle as given by Equation 21 continues to increase with movement of the mobile body toward position $P_2$. Since the phase angle of the reference current from beat oscillator 17 is independent of the movement of the mobile body the counter in the integrator 19 records every 360-degree phase angle change. On the other hand, if the plane moves from position $P_1$ toward $P_3$ located near to station A and farther away from station $B_1$ than $P_1$ the factor $$\frac{h-g}{c}$$

changes from a zero to a negative value and it continues to decrease until position $P_3$ is reached. The number of net degrees, radians, or cycles gained or lost, as a result of the movement of the mobile body and counted by the integrator 19 is an indication, not of the actual distance traveled, but of the change of location with respect to stations A and $B_1$. The indication is not in any way affected by, or related to, the speed of transit of the airplane or the time consumed in making a flight or the geometrical nature, linear or tortuous, of the path or course followed by the mobile body. In a similar manner, the integrator 20 indicates the change of position of the plane relative to the line connecting stations A and $B_2$.

By observing the registration on both indicators at a known starting point $P_1$, at which each counter has a predetermined reading, and observing the registrations on both counters at any given subsequent time, the position of the plane with respect to the three stations A, $B_1$ and $B_2$ may be ascertained and the straight line distance separating the starting and termination points may be determined. If desired, a mechanism which may be set or adjusted at the known starting point prior to the beginning of travel may be utilized to operate a camera, bomb release, etc., whenever one counter gives a predetermined registration and similarly the other counter gives another predetermined registration. If desired, the transmission from each station may be camouflaged by voice broadcast modulation of the emitted radio frequency waves.

Referring to Fig. 4, the 100-kilocycle oscillator 17, auxiliary modulator 18 and the detectors 14, employed in the arrangement of Fig. 2, are in the modified receiving circuit. In Fig. 4, integrator 19 is included between the outputs of the subharmonic generator 16 and the filter 13 in channel L; and integrator 20 is connected to the outputs of the subharmonic generator 16 and a filter 13 in channel N. Considering the receiving system of Fig. 4, the high frequency current $$F\left(t-\frac{h}{c}\right)$$

Equation 18, becomes the reference current. The high frequency signal currents utilized for integration in channels L and N are given by Equations 15 and 16, respectively. In the modified system the phase angles are measured and integrated at the very high radio frequency $F(3,000,000)$, whereas in the system including the 100-kilocycle oscillator 17 the integration occurs at the relatively low or intermediate frequency of 100 kilocycles. Inasmuch as the instantaneous phase angle change may be measured and integrated more easily and more accurately at the intermediate frequency $f=100$ kilocycles than at the radio frequency $F=3,000,000$ cycles, and since integrators designed to operate at intermediate frequencies are more easily manufactured and maintained than those designed to operate at a radio frequency, the system of Fig. 2 comprising the auxiliary oscillator 17, and in which the phase angle changes in the radio frequency received wave are transferred to and impressed upon the intermediate frequency 100-kilocycle wave, is preferred over the modified arrangement of Fig. 4.

Referring again to Fig. 1, it will be observed that at relay stations $B_1$ and $B_2$ the received and retransmitted waves differ by a multiple of the fundamental frequency $F=3$ megacycles. Thus at station $B_1$ the received and transmitted frequencies are 24 megacycles and 27 megacycles, respectively, and at station $B_2$ the received and transmitted frequencies are 24 megacycles and 21 megacycles, respectively. Because of the difference in the order of several million cycles in the received and transmitted frequencies at each relay station, singing and other interference phenomena are, in accordance with one feature of the invention, avoided at the relay station. Moreover, as already pointed out, since all frequencies utilized at the three transmitted stations, including the frequencies received and retransmitted at each relay station, are derived from the oscillator 1 at station A, the frequency difference at each relay station between the received and transmitted waves is maintained.

Although the invention has been explained in connection with certain embodiments including a modified receiving arrangement, it should be understood that it is not to be limited to the embodiment described inasmuch as other apparatus may be employed in successfully practicing the invention. As is believed to be apparent, the position of the mobile body may, in accordance with the invention, be determined in a plane other than the azimuthal plane as, for example, a vertical plane.

What is claimed is:

1. In a phase integration position determining system, means for transmitting from two spaced geographical points waves of different frequencies, means at a mobile body for securing a reference current having a constant phase angle and for obtaining from said waves a signal current having a phase angle variation dependent upon only the difference in the distances of said body to said points, and a phase integrator at said mobile body for comparing said currents.

2. In a phase integration position determining system, means for transmitting from spaced geographical points a pair of waves of different frequencies, receiving means at a mobile body for obtaining from both of said waves a first current and from only one of said waves a second current, said currents having equal frequencies, the phase angle of the first current being representative of the difference in the distances between said mobile receiver and said stations and the phase angle of the second current being independent of said difference, and means controlled by said currents for integrating during movement of said body the relative phase angle changes in said currents.

3. In combination, a pair of spaced ground stations for radiating harmonically related frequencies, a receiver on a mobile body for receiving said waves, said receiver including means for obtaining from said waves a signal current having a frequency equal to a submultiple of each of said waves and a phase angle representative of the distance between said mobile body and one of said stations and the difference in the distances between said body and both stations, means for obtaining from one of the received waves a reference current having the same submultiple frequency and a phase angle representative of the first-mentioned distance, and means connected to both of said means for integrating the phase angle change of the signal current during travel of said body.

4. In combination, means for radiating from two spaced geographical points different harmonic waves derived from a given fundamental frequency, receiving means on a mobile body for obtaining from said waves a signal current and a reference current both of said said fundamental frequency, the phase angle of the signal current being representative of the position of said body with respect to said points and the phase angle of the reference current being representative of the position of said body with respect to only one of said points, and an integrator controlled by said currents for ascertaining the net change in phase angle of the signal current relative to the change in phase angle of the reference current resulting from travel of said body, said integrator being responsive to every instantaneous change in phase angle, and a counter controlled by said integrator for indicating the net number of cycles of phase angle change.

5. In combination, means at a first station for securing a wave of a given frequency $F$ and transmitting a harmonic $nF$ of said frequency to a relay station and to a mobile body, means at said relay station for deriving from the received wave the harmonic $(n+1)F$ of said frequency and transmitting said wave to said mobile body, and means on said mobile body for obtaining from said waves a reference current and a signal current having the same given frequency and an instantaneous difference in their phase angle variations related to the instantaneous change of position of said body with respect to said stations, and a measuring means actuated by said currents for integrating the instantaneous differences during travel of said body.

6. A combination in accordance with claim 5, a second relay station for receiving the wave emitted by the first station and means at said second station for deriving from the received wave a harmonic $(n-1)F$ of said given frequency and transmitting said $(n-1)F$ harmonic to the mobile body, means at said mobile body for obtaining from the $nF$ and $(n-1)F$ waves a second signal current having said given frequency, the instantaneous difference in the phase angle variations of said second signal current and said reference current being related to the instantaneous change of position of said body with respect to said first station and said second relay station, and a second measuring means actuated by said last-mentioned currents for integrating the last-mentioned instantaneous differences during travel of said body.

7. In combination, a first transmitting station for radiating a wave of a given carrier frequency, a relay station spaced from the first station for radiating a wave of different frequency, the frequency of the last-mentioned wave being derived from the first wave and the frequency difference between said waves being a submultiple of each radiated wave, and means at a mobile station for obtaining from the transmitted wave a signal current having a phase angle related to the position of mobile station and a reference current having a substantially constant phase angle, and means controlled by said currents for integrating the relative changes in phase angle of said currents during the travel of said mobile station.

8. In combination, a primary station, and two relay stations spaced therefrom for radiating three different harmonics of a fundamental radio frequency, receiving means at a mobile body comprising a first channel for deriving from the harmonic received from the primary station a reference current of the fundamental frequency, a second channel for deriving from the last-mentioned harmonic and the harmonic received from one of the relay stations a first signal current of said fundamental frequency, a third channel for deriving from the first-mentioned harmonic and the harmonic received from the other relay station a second signal current of fundamental frequency, said first signal current having a phase angle variation related to both the change in the distance between said body and the primary station and the change in the difference in the distances between said body and said primary station and the first-mentioned relay station, said second signal current having a phase angle variation related to both the change in the first-mentioned distance and the change in the difference in the distances between said body and the primary station and the second-mentioned relay station, said reference current having a phase angle variation related to the change in said first-mentioned distance, means including a beat oscillator for deriving from the reference current and the first signal current a first intermediate frequency signal current having a phase angle variation representing the first-mentioned difference and for deriving from said reference current and the second signal current a second intermediate frequency current having a phase angle variation representing the second-mentioned difference, a first phase integrator actuated by the first intermediate frequency signal current and an intermediate frequency reference current of constant phase angle from said beat oscillator, and a second phase integrator actuated by the second intermediate frequency current and another intermediate frequency reference current of constant phase angle from said beat oscillator.

9. A method of position determination utilizing two spaced stations which comprise transmitting from one station a wave having a frequency $nF$, where $n$ is any integer, obtaining at the second station from said wave another wave having a frequency $(n\pm1)F$ and transmitting said wave, obtaining at a mobile receiver from both transmitted waves a signal current F having a variation related to the change in the difference of the distances between said mobile receiver and said stations, obtaining from the first-mentioned wave $nF$ a reference current F having a phase angle independent of said change, and continuously comparing and integrating the phase differences between said waves during travel of the mobile receiver.

10. A method of position determination utilizing two spaced stations which comprises transmitting from one station a wave having a frequency $nF$, where $n$ is any integer, obtaining at the second station from said wave another wave having one of the frequencies $(n \pm 1)F$ and transmitting said last-mentioned wave, obtaining at a mobile receiver for both transmitted waves a signal current F having a phase angle variation representative of the change in the difference of the distances between said mobile receiver and said stations, obtaining from the first-mentioned wave $nF$ a reference current F having a phase angle variation independent of said change, changing the frequency of the reference and signal currents each to the same intermediate frequency, and integrating the phase differences between said waves during travel of the mobile receiver.

WILLIAM M. GOODALL.